(12) United States Patent
Pan

(10) Patent No.: US 12,487,724 B2
(45) Date of Patent: Dec. 2, 2025

(54) INTERACTION METHOD, ELECTRONIC DEVICE, STORAGE MEDIUM AND PROGRAM PRODUCT

(71) Applicant: Beijing Zitiao Network Technology Co., Ltd., Beijing (CN)

(72) Inventor: Keting Pan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 123 days.

(21) Appl. No.: 18/567,602

(22) PCT Filed: Jul. 27, 2022

(86) PCT No.: PCT/CN2022/108408
§ 371 (c)(1),
(2) Date: Dec. 6, 2023

(87) PCT Pub. No.: WO2023/011296
PCT Pub. Date: Feb. 9, 2023

(65) Prior Publication Data
US 2024/0272761 A1  Aug. 15, 2024

(30) Foreign Application Priority Data
Aug. 4, 2021 (CN) .......................... 202110899083.2

(51) Int. Cl.
*G06F 3/0481* (2022.01)
(52) U.S. Cl.
CPC .................. *G06F 3/0481* (2013.01)
(58) Field of Classification Search
CPC ............... G06F 3/0481; G06F 3/04812; G06F 3/04815; G06F 3/04842; G06F 3/0482
See application file for complete search history.

(56) References Cited

U.S. PATENT DOCUMENTS

| | | |
|---|---|---|
| 5,475,421 A | 12/1995 | Palmer et al. |
| 5,594,859 A | 1/1997 | Palmer et al. |

(Continued)

FOREIGN PATENT DOCUMENTS

| | | |
|---|---|---|
| CN | 105843396 A | 8/2016 |
| CN | 108170277 A | 6/2018 |

(Continued)

OTHER PUBLICATIONS

Kar-Han Tan et al., ConnectBoard: A remote collaboration system that supports gaze-aware interaction and sharing, Oct. 1, 2009, IEEE International Workshop on Multimedia Signal Processing, pp. 1-6 (Year: 2009).*

(Continued)

*Primary Examiner* — Tam T Tran
(74) *Attorney, Agent, or Firm* — Astute IP Law Group

(57) ABSTRACT

Provided are an interaction method and system, and a device, a storage medium and a program product. A first device receives a first interaction on a first interface and generates a first graphic object presented on the first interface, wherein the first interface presents a first image that is captured by a first camera of the first device. The first device generates first interaction information for indicating the first interaction based on a first camera parameter of the first camera and sends the first interaction information to a second device, which presents on a second interface a second graphic object corresponding to the first interaction based on the first interaction information and a second camera parameter of a second camera of the second device, wherein the second interface presents a second image captured by the second camera.

20 Claims, 16 Drawing Sheets

(56) References Cited

U.S. PATENT DOCUMENTS

| | | | |
|---|---|---|---|
| 8,613,620 | B2 | 12/2013 | Barasch et al. |
| 9,100,200 | B2 | 8/2015 | Nerst et al. |
| 9,122,758 | B1 | 9/2015 | Blower et al. |
| 10,085,124 | B2 | 9/2018 | Patel et al. |
| 10,152,590 | B2 | 12/2018 | Liu et al. |
| 10,298,882 | B1 | 5/2019 | Galloway et al. |
| 10,979,481 | B2 | 4/2021 | Jayaweera |
| 11,394,757 | B2 | 7/2022 | Takahashi et al. |
| 11,416,202 | B2 | 8/2022 | Hinohara et al. |
| 2014/0028784 | A1 | 1/2014 | Deyerle et al. |
| 2017/0053447 | A1 | 2/2017 | Chen et al. |
| 2017/0235537 | A1 | 8/2017 | Liu et al. |
| 2018/0027078 | A1 | 1/2018 | Sinn et al. |
| 2018/0121214 | A1 | 5/2018 | Faulkner et al. |
| 2019/0045014 | A1 | 2/2019 | Shaw et al. |
| 2019/0075065 | A1 | 3/2019 | Arastafar et al. |
| 2019/0370544 | A1 | 12/2019 | Wright, Jr. et al. |
| 2019/0379940 | A1* | 12/2019 | Bentovim .......... H04N 21/6587 |
| 2020/0045264 | A1 | 2/2020 | Galloway et al. |
| 2020/0367970 | A1 | 11/2020 | Qiu et al. |
| 2020/0394012 | A1 | 12/2020 | Wright, Jr. et al. |
| 2021/0044645 | A1 | 2/2021 | Jayaweera |
| 2021/0092170 | A1 | 3/2021 | Takahashi et al. |
| 2021/0168423 | A1 | 6/2021 | Singh et al. |
| 2021/0201530 | A1 | 7/2021 | Cowburn et al. |
| 2021/0397585 | A1* | 12/2021 | Seward ................. G06F 16/176 |
| 2022/0317867 | A1* | 10/2022 | Narayanan .......... G06F 3/04845 |
| 2022/0417617 | A1 | 12/2022 | Zhao et al. |

FOREIGN PATENT DOCUMENTS

| | | | |
|---|---|---|---|
| CN | 110851095 | A | 2/2020 |
| CN | 112492048 | A | 3/2021 |
| CN | 112583822 | A | 3/2021 |
| CN | 112684995 | A | 4/2021 |
| CN | 113190778 | A | 7/2021 |
| JP | 2005-242899 | A | 9/2005 |
| JP | 2010-244501 | A | 10/2010 |
| JP | 2011-034511 | A | 2/2011 |
| JP | 2011-192036 | A | 9/2011 |
| JP | 2014-010747 | A | 1/2014 |
| JP | 2014-232459 | A | 12/2014 |
| JP | 2015-033111 | A | 2/2015 |
| JP | 2017-004542 | A | 1/2017 |
| JP | 2017-134160 | A | 8/2017 |
| JP | 2020-525946 | A | 8/2020 |
| WO | 2016173326 | A1 | 11/2016 |
| WO | 2020104929 | A1 | 5/2020 |

OTHER PUBLICATIONS

Andreas Kunz et al., CollaBoard: A Novel Interactive Electronic Whiteboard for Remote Collaboration with People on Content, Oct. 1, 2010, IEEE International Conference on Cyberworlds, pp. 430-437 (Year: 2010).*

International Search Report in PCT/CN2022/108408, mailed Oct. 9, 2022, 4 pages.

Extended European Search Report for European Patent Application No. 22853610.8, mailed Oct. 8, 2024, 9 pages.

Extended European Search Report for European Patent Application No. 22853608.2, mailed on Oct. 17, 2024, 8 pages.

Aoki et al., "Ubiquitous Secure Multi-party Computation Framework: Fairy Ring", The Information Processing Society of Japan Symposium Series, Japan, vol. 2012 No. 1, Jul. 4, 2012, pp. 1618-1627 (English Abstract Submitted).

Communication pursuant to Rules 70(2) and 70a(2) EPC received for European Patent Application No. 22853608.2, mailed Nov. 6, 2024, 1 page.

Communication pursuant to Rules 70(2) and 70a(2) EPC received for European Patent Application No. 22853610.8, mailed on Oct. 25, 2024, 1 page.

Office Action received for Japanese Patent Application No. 2023-575806, mailed on Jan. 7, 2025, 18 pages (8 pages of English Translation and 10 pages of Original Document).

Office Action received for Japanese Patent Application No. 2023-575806, mailed on Jun. 24, 2025, 17 pages (8 pages of English Translation and 9 pages of Original Document).

Office Action received for Japanese Patent Application No. 2024-506914, mailed on Jan. 7, 2025, 8 pages (4 pages of English Translation and 4 pages of Original Document).

Replaced Written Opinion received for PCT Patent Application No. PCT/CN2022/108408, mailed on Dec. 21, 2023, 3 Pages (Original copy only).

Replaced Written Opinion received for PCT Patent Application No. PCT/CN2022/108408, mailed on Oct. 9, 2022, 3 Pages (Original copy only).

Written Opinion for Singapore Application No. 11202309360V, mailed Dec. 31, 2024, 7 pages.

Written Opinion received for PCT Patent Application No. PCT/CN2022/108408, mailed on Jan. 5, 2024, 7 Pages (4 pages of English Translation and 3 pages of Original Document).

Brew, "Verizon and Snap Inc. Debut First-Ever 5G Landmarker Lens," Products Plans, Home Entertainment, News Center, Verizon Works Blog, Nov. 17, 2020, 3 Pages.

Stein, "Lego Now Has a Multiplayer AR Brick-building Lens in Snapchat", CNET, Retrieved from URL: https://www.cnet.com/tech/services-and-software/lego-now-has-a-multilayer-ar-brick-building-lens-in-snapchat/, May 20, 2021, 7 Pages.

Gartenberg, "Snapchat Gets Augmented Reality Legos You Can Build With a Friend", The Verge, May 20, 2021, 2 Pages.

International Search Report and Written Opinion for International Application No. PCT/SG2022/050479, mailed Apr. 4, 2023, 8 Pages.

International Search Report and Written Opinion for International Application No. PCT/SG2022/050510, mailed Feb. 8, 2023, 9 pages.

Notice of Allowance for U.S. Appl. No. 17/394,391, mailed Sep. 2, 2022, 13 Pages.

Spark AR Team, "Spark AR Previews Multipeer API for Video Calling", Spark AR, Retrieved from URL: https://sparkar.facebook.com/blog/spark-ar-previews-multipeer-api-for-ar-video-calling/, Jun. 2, 2021, 7 Pages.

* cited by examiner

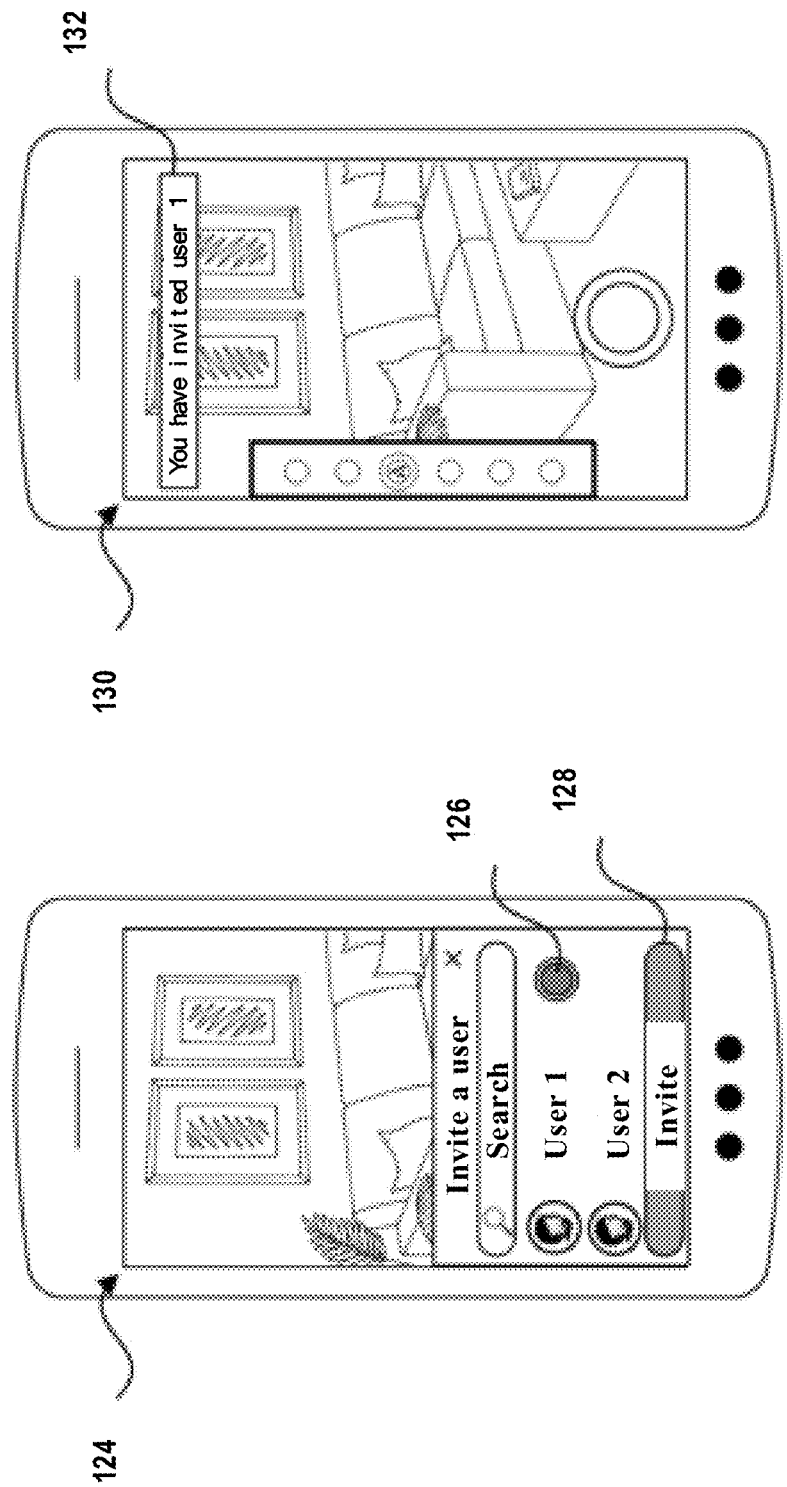

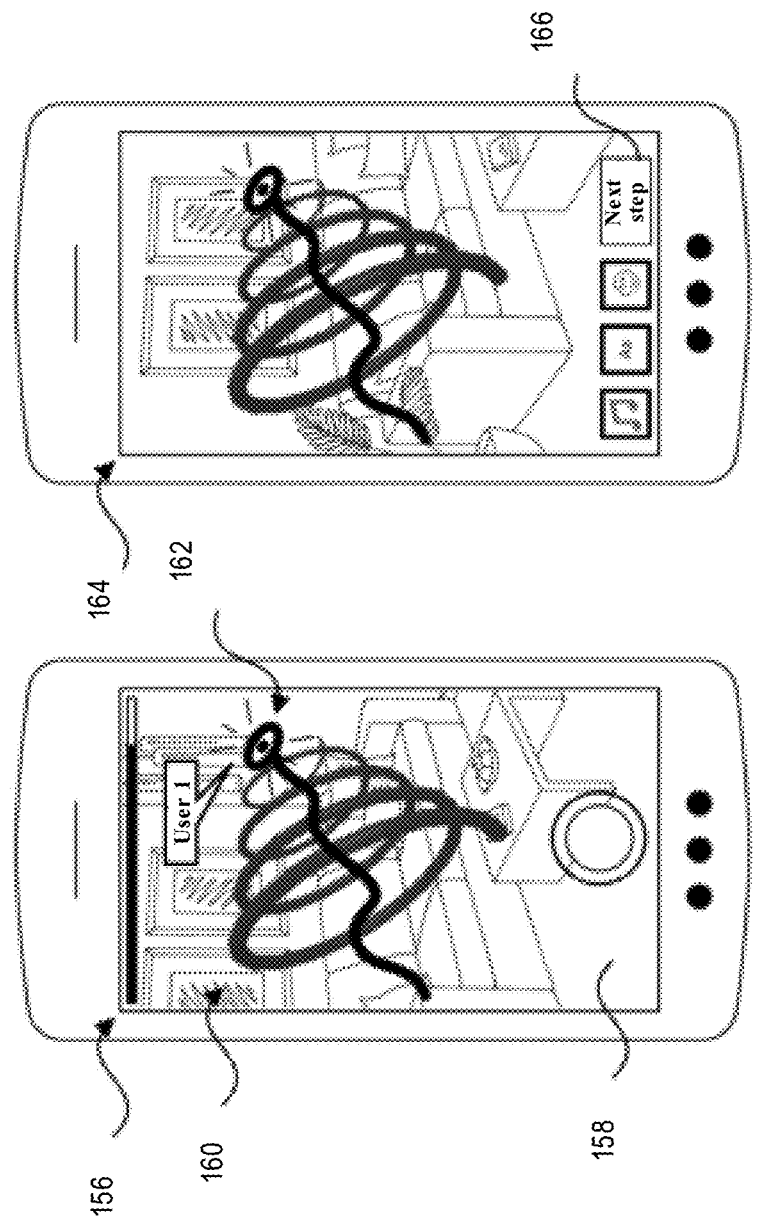

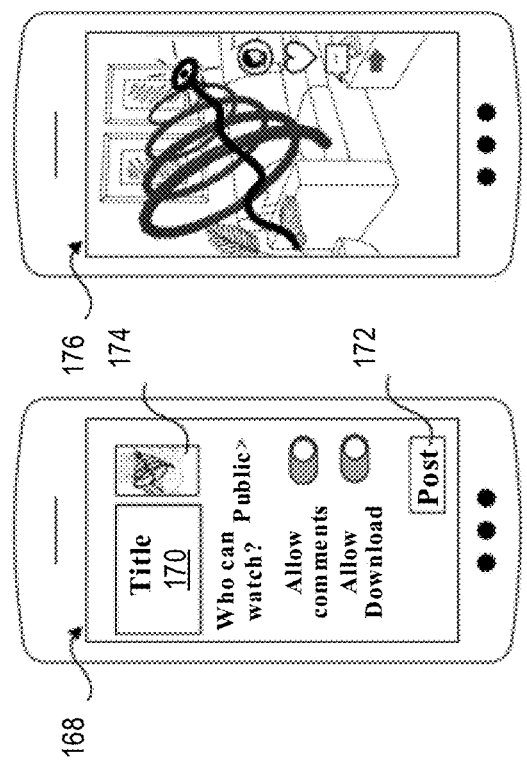

INTERACTION METHOD, ELECTRONIC DEVICE, STORAGE MEDIUM AND PROGRAM PRODUCT

CROSS-REFERENCE OF RELATED APPLICATIONS

The present application is a U.S. National Stage Application of PCT Application Serial No. PCT/CN2022/108408, filed on Jul. 27, 2022, which claims priority to Chinese patent application No. 202110899083.2 filed on Aug. 4, 2021, entitled as "INTERACTION METHOD, ELECTRONIC DEVICE, STORAGE MEDIUM AND PROGRAM PRODUCT", the disclosures of which are incorporated herein by reference in their entireties.

FIELD

Various implementations of the present disclosure relate to the field of computers, and more specifically, to a method, electronic device, storage medium and program product for interactions.

BACKGROUND

With the development of the Internet Age, more and more users begin to create video contents and post the created video contents on the Internet to share with other users. In the process of creating a video content, some video platforms usually provide users with personalized creation methods, such as filters, special effects, personalized stickers, etc. However, such video creation methods usually rely on the creativity of a single user and could not provide support for interactions between multiple users.

SUMMARY

In a first aspect of the present disclosure, there is provided a method for interactions, wherein the method comprises:
receiving, by a first device, a first interaction on a first interface;
generating, based on the first interaction, a first graphic object displayed on the first interface, wherein the first interface further displays at least a first image captured by a first camera of the first device;
generating, based on a first camera parameter of the first camera, first interaction information indicating the first interaction; and
transmitting, to a second device, the first interaction information to cause the second device to display on a second interface a second graphic object corresponding to the first interaction based on the first interaction information and a second camera parameter of a second camera of the second device, wherein the second interface further displays at least a second image captured by the second camera.

In a second aspect of the present disclosure, there is provided an electronic device. The electronic device comprises: an interaction module configured to receive a first interaction on a first interface: generate, based on the first interaction, a first graphic object displayed on the first interface, wherein the first interface further displays at least a first image captured by a first camera of the electronic device: generate, based on a first camera parameter of the first camera, first interaction information indicating the first interaction; and a network module configured to transmit, to a second device, the first interaction information, to cause the second device to display on a second interface a second graphic object corresponding to the first interaction based on the first interaction information and a second camera parameter of a second camera of the second device, wherein the second interface further displays at least a second image captured by the second camera.

In a third aspect of the present disclosure, there is provided an electronic device comprising: a memory; and a processor: wherein the memory stores one or more computer instructions which, when executed by the processor, cause the electronic device to implement the method according to the first aspect.

In a fourth aspect of the present disclosure, there is provided a computer readable storage medium having one or more computer instructions stored thereon, wherein the one or more computer instructions, when executed by a processor, implement the method according to the first aspect.

In a fifth aspect of the present disclosure, there is provided a computer program product including one or more computer instructions which, when executed by a processor, implement the method according to the first aspect.

Various embodiments of the present disclosure can effectively implement the AR session interactions between a plurality of users and enhance the user experience. In addition, by multiplexing the camera parameters, the embodiments of the present disclosure may effective reduce the network bandwidth required for transmitting the interaction information.

BRIEF DESCRIPTION OF THE DRAWINGS

Through the following detailed description with reference to the accompanying drawings, the above and other features, advantages and aspects of various embodiments of the present disclosure will become more apparent. Throughout the drawings, same or similar reference signs indicate same or similar elements. In the drawings:

FIGS. 1A to 1M illustrate example user interfaces according to various embodiments of the present disclosure;

DETAILED DESCRIPTION OF EMBODIMENTS

Embodiments of the present disclosure will be described below in more details with reference to the drawings. Although the drawings illustrate some embodiments of the present disclosure, it should be appreciated that the present disclosure may be implemented in various manners and should not be limited to the embodiments explained herein. On the contrary, the embodiments are provided for a more thorough and complete understanding of the present disclosure. It is to be understood that the drawings and the embodiments of the present disclosure are provided merely for the exemplary purpose, rather than restricting the protection scope of the present disclosure.

In the description of the embodiments of the present disclosure, the term "includes" and its variants are to be read as open-ended terms that mean "includes, but is not limited to." The term "based on" is to be read as "based at least in part on." The term "one embodiment" or "this embodiment" is to be read as "at least one embodiment." The terms "first" and "second" etc. may refer to different or same objects. Other explicit and implicit definitions may also be provided in the following description.

At present, more and more users start to create video contents and post the created video contents on the Internet to share with other users. To create the video contents, some video platforms usually provide numerous ways for the users to create or edit the videos, such as filters, special effects and personalized stickers etc. However, such video creation method usually depends on the creativity of a single user and could not provide support for interactions between multiple users.

In view of this, the embodiments of the present disclosure provide an interaction solution. In accordance with the solution of the present disclosure.

Accordingly, the embodiments of the present disclosure can support a plurality of users to implement augmented reality AR interactions across the devices, to convert graphic objects generated by the AR interaction acts of the first user on the first device into graphic objects seen by the second user on the second device. Those graphic objects, for example, may be represented as corresponding visual special effects. In addition, by multiplexing the camera parameter, the embodiments of the present disclosure also can effectively reduce the network bandwidth required for transmitting the interaction information, which further enhances the efficiency of multi-user interactions.

Embodiments of the present disclosure are to be specifically described with reference to the drawings.

AR Session

Example procedures of AR interactions in accordance with embodiments of the present disclosure are to be described with reference to FIGS. 1A to 1M and FIGS. 2A to 2K. FIGS. 1A to 1M illustrate example user interfaces according to the embodiments of the present disclosure.

Figure 1B:
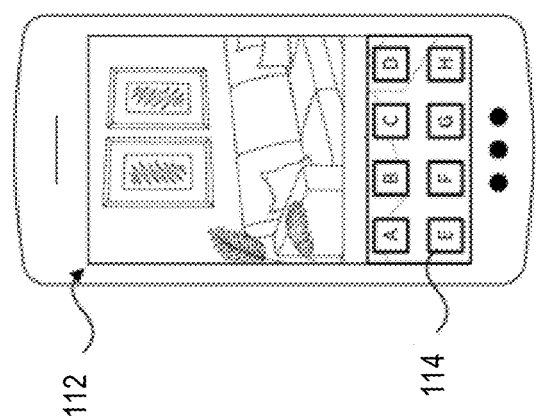
Figure 1A:
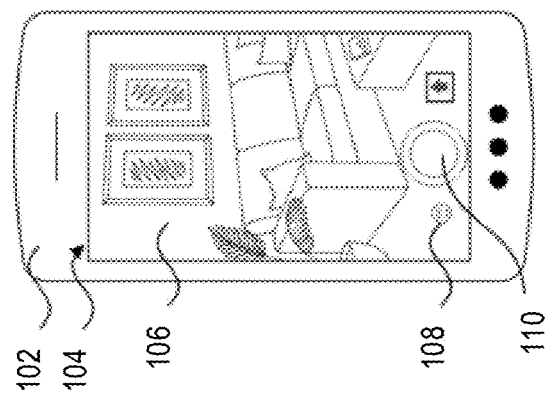

In some embodiments, as shown in FIG. 1A, a computing device 102 may display a user interface 104. Schematically, the computing device 102 may display the user interface 104 in response to an operation on a video application installed on the computing device 102 by the user. The user interface 104, for example, may include an interface provided by the video application for creating and displaying video contents.

As shown in FIG. 1A, the user interface 104 for example may display images captured by the camera of the computing device 102 as background scene 106. Along with the movement of the computing device 102 or camera, the background scene 106 may correspondingly change.

Besides, according to FIG. 1A, the user interface 104 also may display a filming control 110, which may allow the user (e.g., user A) associated with the computing device 102 to record videos and one or more visual special effects associated with the videos, e.g., filter special effect, sticker special effect or subtitle special effect etc.

In some embodiments, the user interface 104 also may display a special effect control 108, and the user may trigger the special effect control 108 to choose the desired special effects. According to FIG. 1B, after the trigger triggers the special effect control 108, the computing device 102 may display in the user interface 12 a special effect panel, which special effect panel may include a plurality of different special effects available for the user of the computing device 102.

Figure 1D:
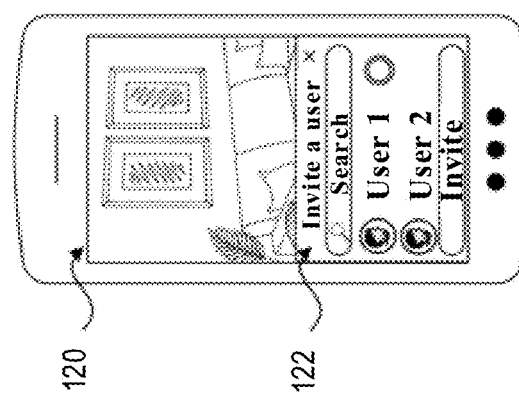
Figure 1C:
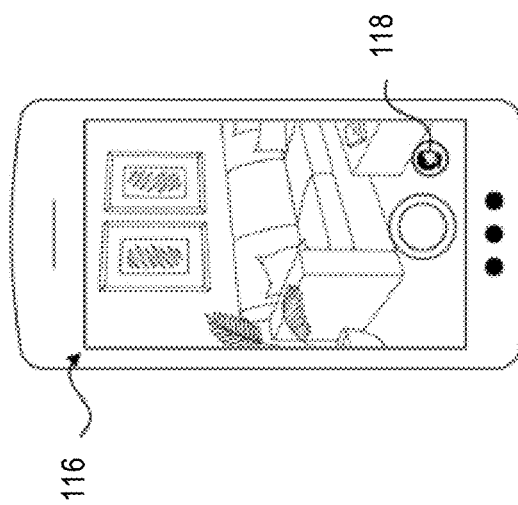

In some embodiments, the special effect panel may include an augmented reality AR session special effect, which is schematically denoted by E. Correspondingly, after the user chooses the AR session special effect 114, the computing device 102 may display a user interface 106. As shown in FIG. 1C, the user interface 106 may display an invitation control 118. The invitation control 118, after being selected by the user A, may be triggered to invite other one or more users to join the AR session.

In some embodiments, after the user A selects the invitation control 118, the computing device 102 may display the user interface 120. As shown in FIG. 1D, the user interface 120 may include an invitation interface 122, to display a group of friends and/or contacts for the user A to choose and invite to join the session.

Schematically, as shown in FIG. 1E, the user may for example select, through the invitation interface 122, "user 1" as an invitation object for the AR interaction session. Furthermore, the user A may click an invitation confirmation control 28 in the friend invitation interface 122, to enable the computing device 120 for example to send to the server a request for inviting the selected user.

After sending the session invitation request by clicking the invitation conformation control 28, the computing device 102 for example may display a user interface 130. According to FIG. 1F, the user interface 130 for example may display the invitation instruction 132, which invitation instruction 132 is used for indicating that the selected user (i.e., "user 1") has been invited to join the AR session.

Figure 1G:
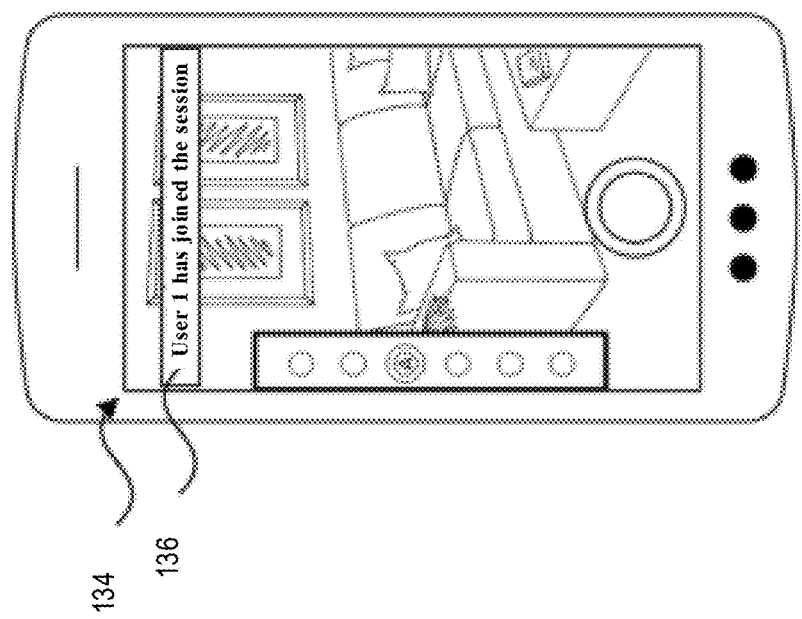

Furthermore, in some embodiments, after the selected user (e.g., "user 1") receives a corresponding request (as introduced with reference to FIGS. 2A to 2K), the computing device 102 for example may display a user interface 134. As shown in FIG. 1G, the user interface 134 may display a join indication 136, which join indication 136 is used for indicating that the invited user has already joined the AR session.

In some embodiments, the computing device 102 may further display a user interface 138. As shown in FIG. 1H, the user interface 138 may include a drawing tool 140. The drawing tool 140 may provide a set of available drawing tools to the user (e.g., user A). According to FIG. 1H, the user A for example may select a drawing tool 142. As an example, different drawing tools for example may correspond to various brushes, such as different ink styles, different brush sizes or different brush colors etc.

In some embodiments, as shown in FIG. 1H, a filming control 144 in the user interface 138 for example may also provide a countdown indication, to notify the user that the video recording will automatically begin for example after three seconds.

Figure 1I:
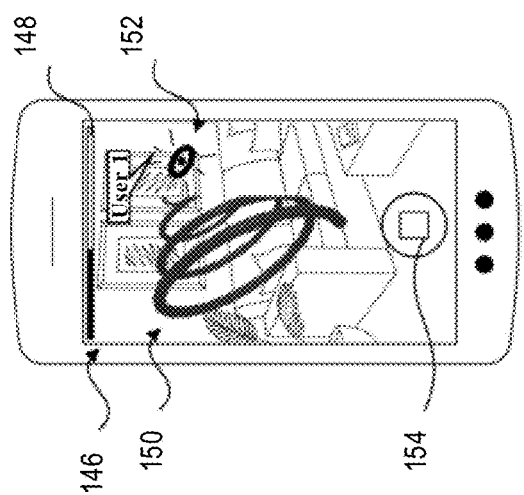
Figure 1H:
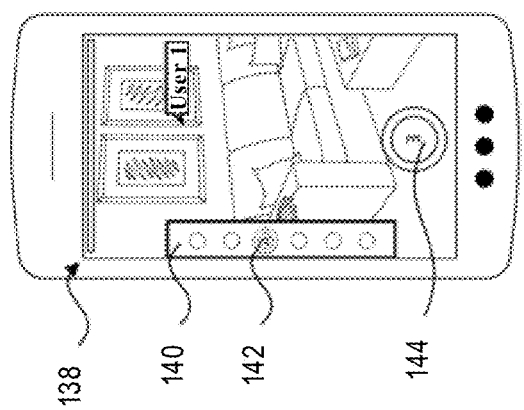

Furthermore, according to FIG. 1I, the computing device 102 may start the video recording and display a user interface 146. The user interface 146, for example, may include a progress indication 148 for indicating the progress of the video recording. Correspondingly, the filming control 154 for example may indicate that the video is being recorded through a particular visual element.

Besides, the computing device 102 also may receive user interactions (e.g., drawing acts on the touch screen) of the user on the user interface 146, generate a graphic object 150 corresponding to the user interactions based on the drawing tool 142 selected by the user A and further display the graphic object 150 on the user interface 146.

In some embodiments, according to FIG. 1I, the computing device 102 also may display in the user interface 146 a graphic object 152 generated from user interactions (such as drawing acts on the touch screen of a further computing device) executed by the invited user (such as user 1) on the further computing device. The specific process for generating the graphic object 150 and the graphic object 152 will be described below with reference to FIG. 4.

In some embodiments, the user interface 146 also may display a friend drawing instruction associated with the invited user 1. For example, the friend drawing instruction may be provided for indicating a position of a cursor where the invited user is currently drawing the graphic object.

According to FIG. 1J, during video recording, the user A for example may move the position of the computing device 102 (or camera) or adjust the orientation of the computing device 102 (or camera). The images captured by the camera of the computing device 102 may accordingly change to display a new background scene 158 different from the background scene 106.

In the user interface 156, the current user A and the invited user 1 may separately complete drawing the visual object (e.g., graphic object) 160 and the visual object (i.e., graphic object) 162. In some embodiments, these visual objects 160 and 162 may be displayed in the user interface 156 in accordance with a corresponding position in a world coordinate system. In this way, the augmented reality effects overlaying the background scene 158 may be displayed.

As shown in FIG. 1K, at the end of video recording, the computing device 102 may display a user interface 164, which user interface for example may display the initial background scene 106 and one or more graphic objects (e.g., the graphic object 160 drawn by the current user A and the graphic object 162 drawn by the invited user 1).

In some embodiments, the user also may further interact with the user interface 164 to edit the filmed video. For example, the user may add texts, music or expressions etc. Furthermore, the user for example also may enter a post interface by clicking the control 166 (e.g., indicating a "next step" operation) in the user interface 164.

According to FIG. 1L, in the post page displayed by the user interface 168, the user A may configure one or more settings associated with video posting. For example, the user A may set up a title 170 of the video content. Alternatively, the user A may configure which users are entitled to view the video content, whether it is allowed to post comments on the video content, or whether download is allowed for the video content etc. Furthermore, when the user A selects a post control 172, the video content for example may be uploaded to a video platform, so as to provide the video content created by the user A to other users on the video platform through video applications. As shown in FIG. 1M, when the user A has completed posting the video content, the computing device 102 may display a user interface 176 to play the video content created by the user A.

Figure 2C:
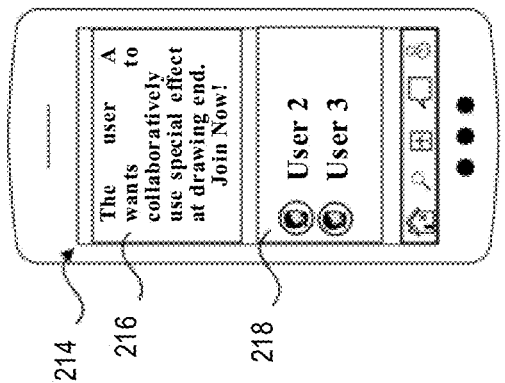
FIGS. 2A to 2K illustrate example user interfaces according to various embodiments of the present disclosure.
Figure 2B:
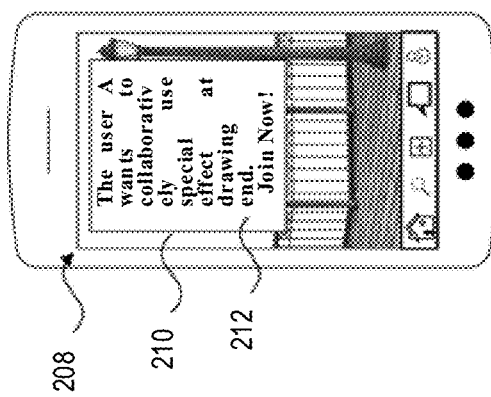
Figure 2A:
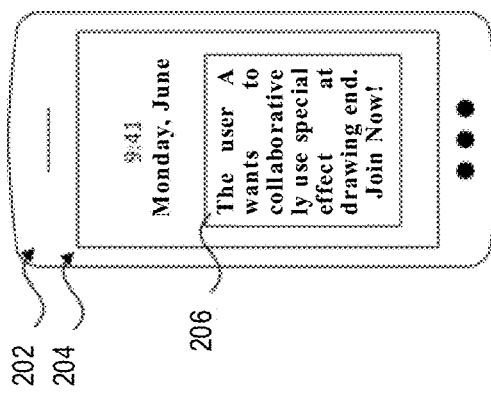

An example procedure of AR interactions in accordance with embodiments of the present disclosure is to be described from the perspective of the invited user (e.g., user 1) with reference to FIGS. 2A to 2K. According to FIG. 2A, the computing device 202 associated with the invited user 1 may display the user interface 204. In some embodiments, the user interface 204 may include a prompt message 206 to indicate that the user A of the computing 10) device 102 is inviting the current user 1 to join the AR session. As an example, the prompt message 206 may include a prompt message displayed on the interface as shown in FIG. 2A.

In some embodiments, the computing device 202 also may display the prompt message about inviting the current user 1 to join the AR session through other ways. According to FIG. 2B, when the user A of the computing device 102 invites the current user 1 of the computing device 202 through the invitation confirmation control 128 to join the AR session, the computing device 202 may display a user interface 208. As shown in FIG. 2B, the user interface 208 may include the displayed prompt message 212 superimposed on the background interface 210, wherein the background interface 210 displays images captured by the camera of the computing device 202. It is to be understood that the prompt message, for 20) example, also may be displayed through any other suitable ways, e.g., top bar prompt etc. In some embodiments, the computing device 202 for example also may provide a user interface 214, which allows the user 1 to view the current prompt message 216 and other messages 218.

In some embodiments, when the user 1 selects the prompt message 206, the prompt message 212 or the prompt message 216, the computing device 202 may automatically connect to the AR session of the computing device 102. In some embodiments, the prompt message 206, the prompt message 212 or the prompt message 216 may be featured with timeliness. For example, in case that the user 1 of the computing device 202 fails to join the session within a predetermined time (e.g., 30 seconds) since the reception of the prompt message 206, the computing device 202 may provide an indication showing that this session is not activated yet when the user 1 clicks the prompt message 206 again.

Figure 2E:
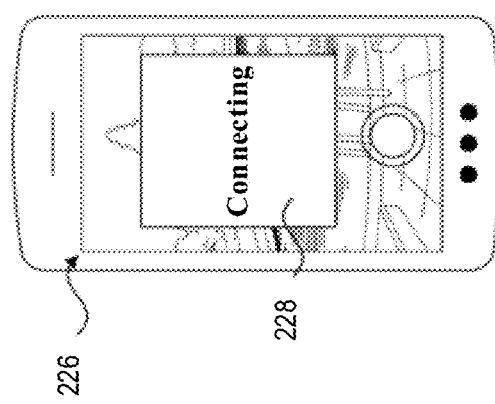
Figure 2D:
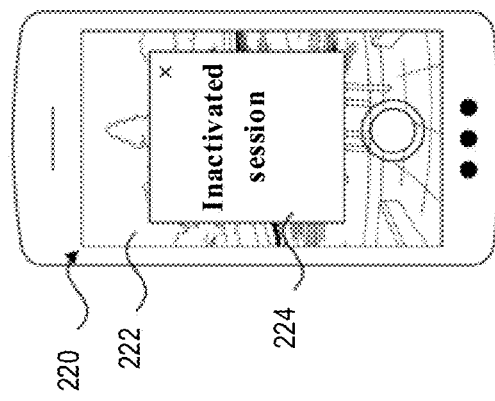
Figure 2F:
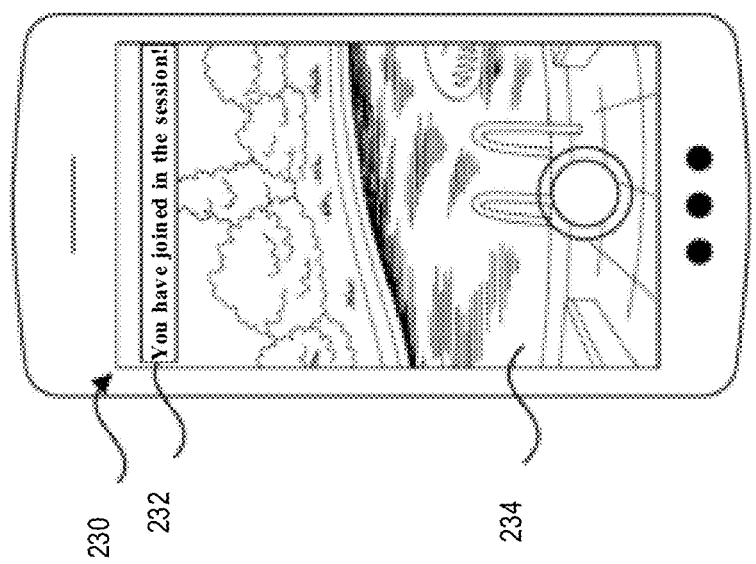

Schematically, as shown in FIG. 2D, when the user 1 selects an expired prompt message, the computing device 202 may display the user interface 220. The user interface 220 for example may include a prompt message 224 displayed overlaying the background interface 222, to indicate that the AR session which it has been invited to join has expired.

In some further embodiments, if the user 1 selects an unexpired prompt message (e.g., prompt message 206, prompt message 212 or prompt message 216), the computing device 202 for example may display a user interface 206. As shown in FIG. 2E, the user interface 206 for example may include a prompt message 228 indicting that the current user 1 is joining the invited AR session.

In some embodiments, when the loading of the AR session is completed, the computing device 202 may display a user interface 230. According to FIG. 2F, the user interface 230 may include a prompt message 232 indicating that the current user 1 has already joined the AR session. Besides, the computing device 202 also may automatically enable the camera to capture environment images as the background scene 234 of the computing device 202 displayed in the user interface 230. With the movement of the computing device 202 or the camera, the contents of the background scene 234 may vary accordingly.

Likewise, the computing device 202 may automatically enable video recording after a predetermined time, or the computing device 202 may enable the video recording in response to the user's choice over the filming control in the user interface 230.

Figure 2I:
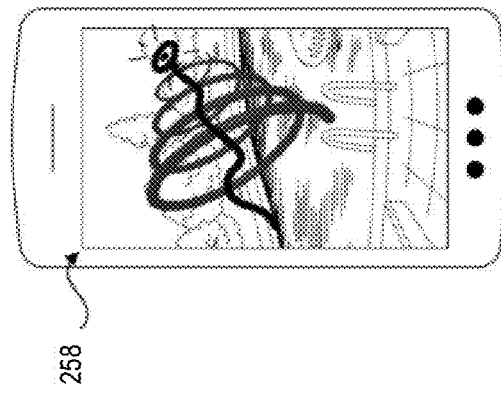
Figure 2H:
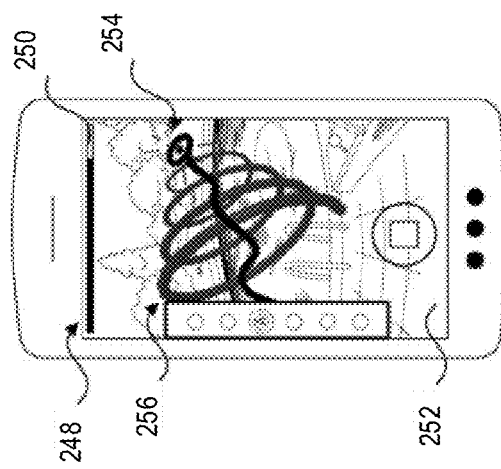
Figure 2G:
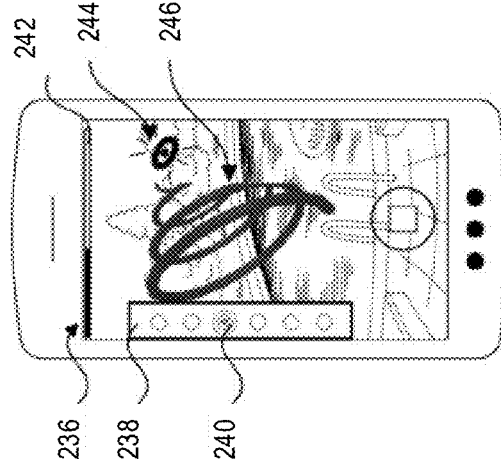

According to FIG. 2G, the computing device 202 may display a user interface 236. The user interface 236 may include a drawing control 238, which may provide to the user 1 a set of available drawing tools. As shown in FIG. 2G, the user for example may select a drawing tool 240. Schematically, different drawing tools for example may correspond to various brushes, such as different ink styles, different brush sizes or different brush colors etc.

Furthermore, according to FIG. 2G, the user interface 236, for example, also may include a progress indication 242 to indicate the progress of the video recording. Correspondingly, the filming control for example may indicate that the video is being recorded through a particular visual element.

In some embodiments, as shown in FIG. 2G, the computing device 202 also may receive user interactions (e.g., drawing acts on the touch screen) of the user 1 on the user interface 236, generate a graphic object 244 corresponding to the user interactions based on the drawing tool 240 selected by the user, and further display the graphic object 244.

In some embodiments, according to FIG. 2G, the computing device 202 also may display in the user interface 236 a graphic object 246 generated from user interactions (such as drawing acts on the touch screen of a further computing device) executed by the other user (e.g., user A associated with the computing device 102) in the AR session on the computing device 202. The specific process for generating the graphic object 244 and the graphic object 246 will be described below with reference to FIG. 4.

As shown in FIG. 2H, during video recording, the user 1 for example may move the position of the computing device 102 (or camera) or adjust the orientation of the computing device 102 (or camera). The images captured by the camera of the computing device 102 may accordingly change to display a new background scene 252 different from the background scene 234.

According to FIG. 2H, in the user interface 248, the user 1 and the user A in the AR session may continue to interact to further obtain updated visual object (i.e., graphic object) 254 and visual object (i.e., graphic object) 256. In some embodiments, the visual object 254 and the visual object 256 may be displayed in the user interface 248 in accordance with corresponding positions in the world coordinate system. In this way, the augmented reality effects overlaying the background scene 252 may be displayed. Furthermore, as shown in FIG. 2I, in the user interface 258, in case that both the user 1 and the user A in the AR session have completed the depicted graphic objects, an updated graphic object may be displayed in the user interface 258.

Figure 2K:
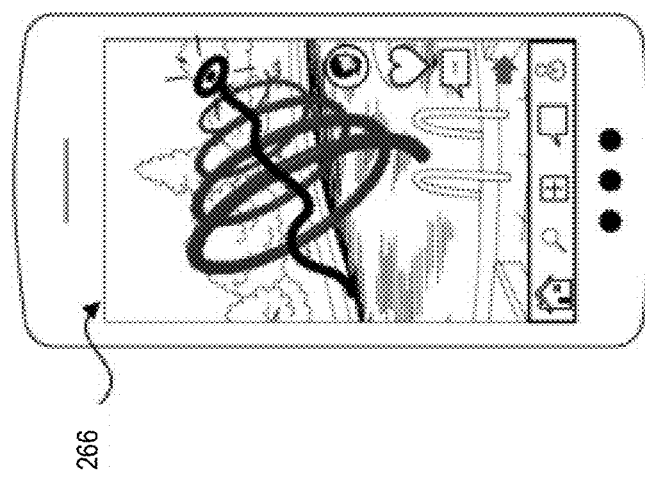
Figure 2J:
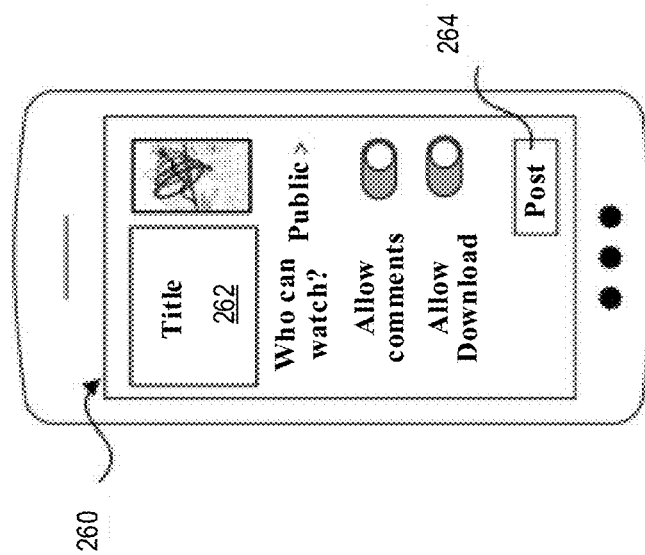

Similar to the user A which initiates the session invitation, the invited user 1 also may similarly post the video content superimposed with the graphic object collaboratively created by the user 1 and the user A. As shown in FIG. 2J, the user 1 may configure one or more settings associated with the posted video in a user interface 260. For example, the user 1 may set up a title 262 of the video content. Alternatively, the user also may configure which users are entitled to view the video content, whether it is allowed to post comments on the video content, or whether download is allowed for the video content etc. Furthermore, when the user 1 selects a post control 264, the video content for example may be uploaded to a video platform, so as to provide the video content created by the user 1 to other users on the video platform through video applications. As shown in FIG. 2K, when the user 1 has completed posting the video content, the computing device 202 may display a user interface 266 to play the video content created by the user 1 in the AR session.

It should be appreciated that although the computing device 102 and/or computing device 202 is illustrated as an intelligent terminal device in FIGS. 1A to 1M and 2A to 2K, any other appropriate portable or non-portable devices may also be included. Examples of the portable or non-portable devices may include, but not limited to, smartphones, tablet computers, desktop computers, smart watches, smart glasses or other wearable devices and smart household equipment etc.

Example Interaction Procedure

Figure 3:
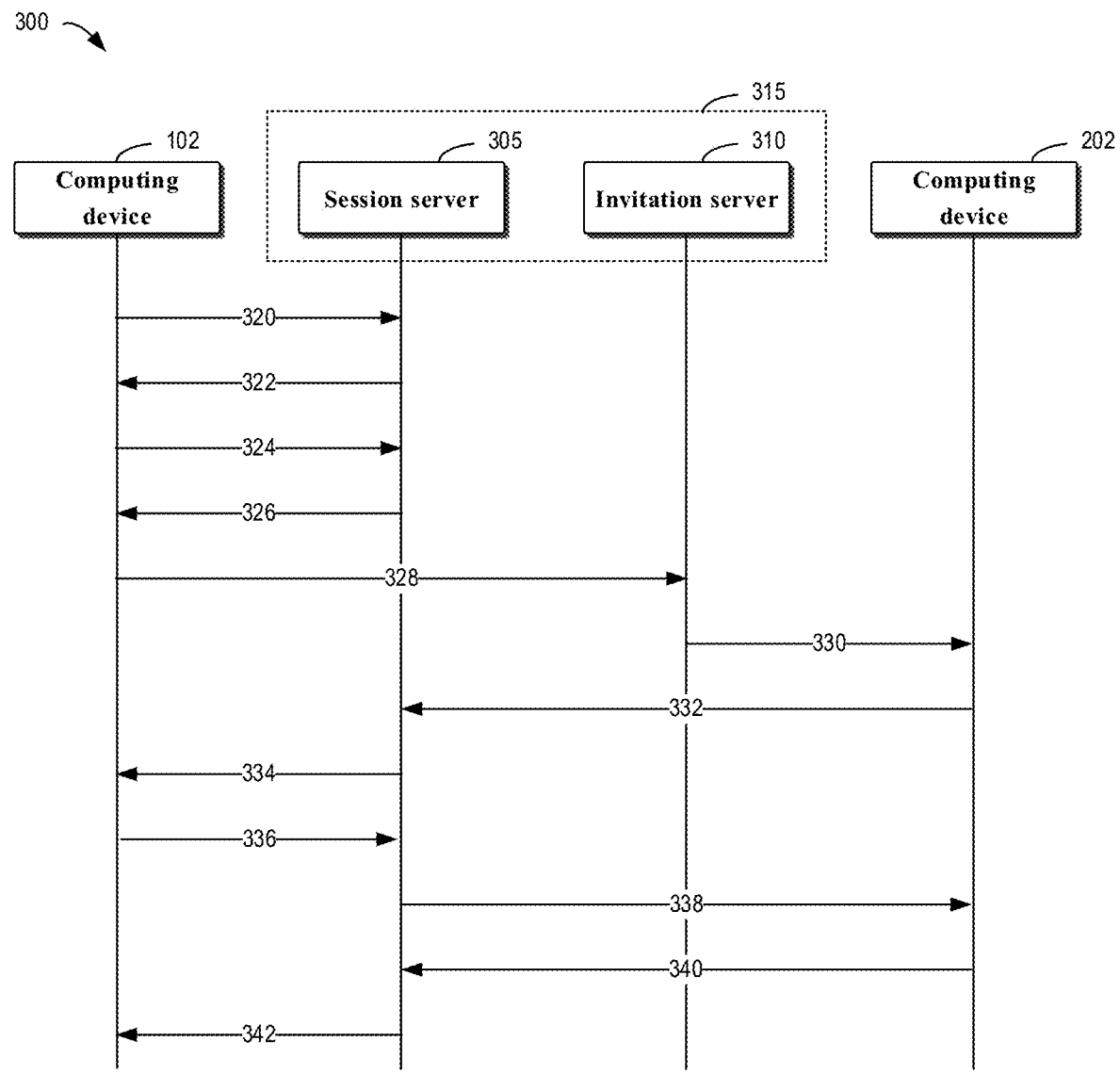
FIG. 3 illustrates a flowchart of an example interaction procedure according to some embodiments of the present disclosure.

FIG. 3 further illustrates a detailed procedure 300 of implementing the AR session described with reference to FIGS. 1A to 1M and 2A to 2K by the computing device 102 and the computing device 202.

As shown in FIG. 3, at 320, the computing device 102 may send to a session server 305 a request for creating a session. In some embodiments, the computing device 102 may initiate a request for creating a session in response to corresponding special effects selected by the user A in the video applications of the computing device 102.

In some embodiments, the session server 305 may be configured to manage various progresses of the session, e.g., creation, destruction and management of the session etc.

At 322, the session server 305 sends to the computing device 102 an indication information that the session has been successfully created.

At 324, in response to the indication that the session has been successfully created, the computing device 102 may send to the session server 305 a request for history data. In some embodiments, the history data for example may be include history graphic objects generated based on the user's history interactions (e.g., history interactions of users in the session) in the session.

At 326, in case of the presence of history data, the session server 305 may send to the computing device 102 the history data, such that the computing device 102 correspondingly generates the user interface corresponding to the session. The history graphic object may be displayed in the user interface.

At 328, the computing device 102 may send to the invitation server 310 an invitation that invites the other user (such as user 1) to join the current session. In some embodiments, the session server 305 and the invitation server 310, for example, may be implemented by different hardware devices. In some embodiments, functions of the session server 305 and the invitation server 310, for example, also may be integrated and implemented by the same server 315.

At 330, the invitation server 310 may send to the computing device 202 associated with the invited user 1 the session invitation of the request for inviting to join the current session. In some embodiments, the session invitation for example may include a link address corresponding to the session. In some embodiments, the link address may be an encrypted session link address.

At 332, the computing device 202 may be connected to the session server 305 based on the link address included in the session invitation.

At 334, the session server 305 notifies the computing device 102 that the user 1 associated with the computing device 202 has accepted the invitation request and joined the session.

At 336, the computing device 102 sends to the session server 305 the interaction information generated on the basis of the user interactions of the user A on the computing device 102.

At 338, the session server 305 may send to the computing device 202 the interaction information received from the computing device 102, such that the computing device 202 generates the graphic object corresponding to the user interactions of the user A on the computing device 102 based on the received interaction information.

At 340, the computing device 202 may notify the session server 305 to exit the current session. As an example, the invited user 1 may operate on the computing device 202 to exit the current AR session. Correspondingly, the computing device 202 may send to the session server 305 a message that the user 1 has exited the AR session.

At 342, the session server 305 may notify the computing device 102 that the other user 1 in the session has exited the current session.

It should be appreciated that similar to steps 336 and 338, the computing device 202 also may send to the session server 305 the interaction information. Such interaction information may be generated based on the user interactions of the user 1 on the computing device 202. The session server 305 may further send the interaction information to the computing device 102, and the computing device 102 accordingly generates the graphic objects corresponding to the user interactions of the user 1 on the computing device 202 based on the received interaction information. The specific process for generating and transmitting the interaction information is to be described in details with reference to FIG. 4.

Example Interaction System

Figure 4:
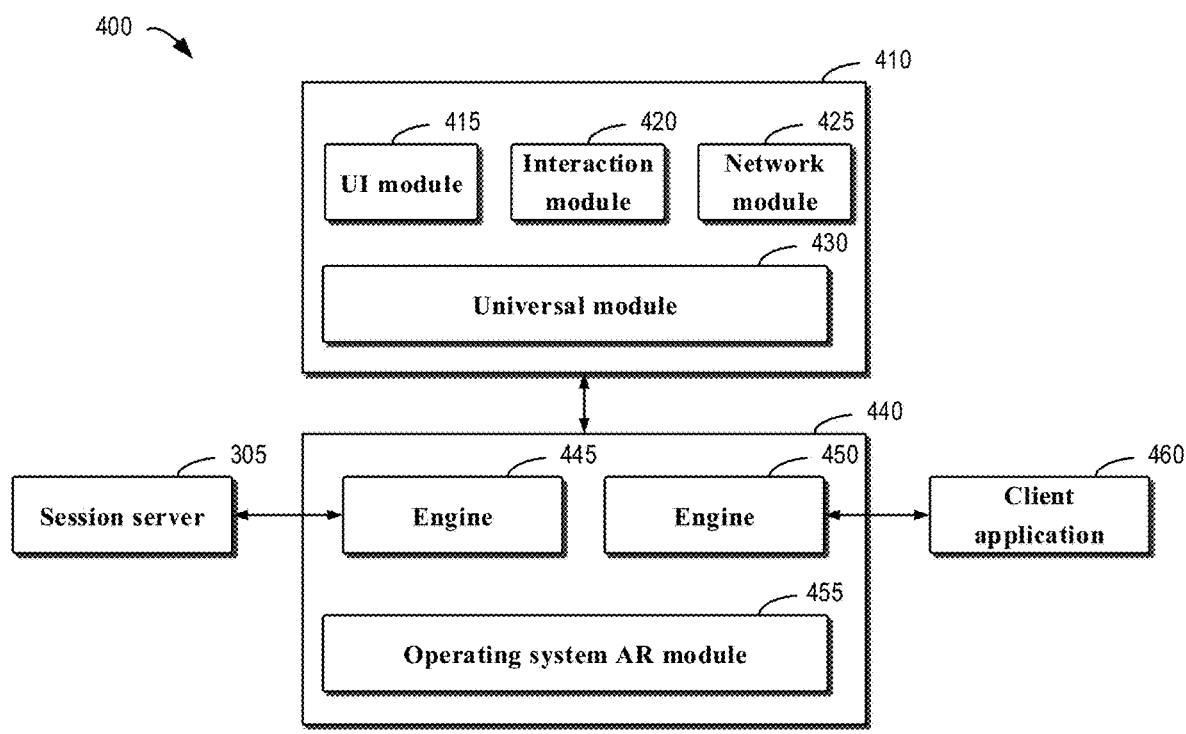
FIG. 4 illustrates a schematic structural diagram of the interaction system according to some embodiments of the present disclosure.

FIG. 4 further illustrates a schematic structural diagram of the interaction system 400 in accordance with some embodiments of the present disclosure.

As shown in FIG. 4, the interaction system 400 may include a lightweight plug-in module 410. In some embodiments, the lightweight plug-in module 410 may be an application plug-in written in scripting language. For example, it may have a relatively small program level and may be hot updated. As such, the developer may more conveniently upgrade the lightweight plug-in module 410, making the development more flexible.

As an example, the lightweight plug-in module 410 for example may include a corresponding AR session special effect module in the application programs mounted on the computing device (e.g., computing device 102). When the user for example selects the AR session special effect 114 through the user interface 112, the AR special effect module written in lightweight scripting language may be enabled to provide functions associated with the AR session to the user.

In some embodiments, as shown in FIG. 4, the lightweight plug-in module 410 may include a user interface (UI) 415, which for example may be configured to provide to the user a user interface associated with the AR session.

In some embodiments, the lightweight plug-in module 410 also may include an interaction module 420, which may be configured to generate graphic objects based on the user interactions received by the computing device 102 that operates the lightweight plug-in module 410. In addition, the interaction module 420 also may generate graphic objects corresponding to the user interactions executed by other users in the session on the associated other computing devices on the basis of the interaction information received from other computing devices (such as computing device 102) in the session.

In some embodiments, the interaction module 420 may detect a pressing operation on the screen of the computing device by the user, to determine the screen coordinates of the user interaction. Moreover, the interaction module may determine a display position of the graphic object based on the screen coordinates and the camera parameter of the camera carried on the computing device. In some embodiments, the camera parameter for example may include upward coordinates, world coordinates and projection matrix of the camera or a clipping matrix from camera to world coordinates etc.

In some embodiments, the interaction module 420 may convert the screen coordinates into coordinates with respect to the camera coordinate system, or coordinates with respect to the world coordinate system based on the camera parameter, so as to display the corresponding graphic objects at respective positions.

For example, the lightweight plug-in module 410 running on the computing device 102 may convert, based on the camera parameter of the camera on the computing device 102, the screen coordinates corresponding to the interactions of the user A on the user interface 156 into world position coordinates for displaying the graphic object 150. As an example, the graphic object 150 may be displayed in brush effects shown by FIG. 1I, and may have corresponding world position coordinates to display to the user the AR effects superimposed on the real world images.

In some embodiments, to synchronize the graphic objects created by the current user on the computing device with other users in the current AR session, the interaction module 420 also may generate the interaction information based on the camera parameter and the user interactions, wherein the interaction information is sent to the computing devices associated with other users in the session.

In the prior art, the display position of the graphic object is usually determined based on the following information: screen coordinates corresponding to the user interactions, wherein the screen coordinates for example may be denoted by a two-dimensional vector: camera upward vector, which may be represented by a three-dimensional vector: world coordinates of the camera, which for example may be a three-dimensional vector: projection matrix of the camera, which for example may be indicated by a 4*4 matrix: clipping matrix from the camera to the world coordinates, which for example may be indicated by a 4*4 matrix.

When the computing devices sends the above information in full to other computing devices associated with other users in the session, the communication overheads are usually huge, which puts a great pressure on bandwidth and results into unexpected interaction delay: For example, in case that the user performs a sliding interaction act on the computing device, it may cost a data transmission overhead of more than 1000 bytes.

In accordance with the embodiments of the present disclosure, to lower the transmission bandwidth of the interaction data, in case of transmitting the interaction information to other computing devices associated with other users in the session, the interaction module 420 may only include the position information of the camera and the orientation information of the camera in the interaction information without sending the screen coordinates, the upward coordinates of the camera, the protection matrix of the camera and the clipping matrix from the camera to the world.

Specifically, the position information of the camera may indicate the position of the camera in the world coordinate system, which for example may be determined through a positioning module of the computing device. The orientation information of the camera, for example, may be represented by the forward vector of the camera. The forward vector of the camera indicates a vector of the camera in a forward direction (also known as vector in look direction), which for example, may be indicated by a three-dimensional vector.

For example, the current computing device (referred to as the first device to facilitate the description) may send to the session server 305 the interaction information, and the interaction information may be further forwarded to the computing device associated with the other user in the session (referred to as the second device to facilitate the description).

Furthermore, subsequent to receiving the interaction information, the interaction module in the lightweight plug-in module running on the second device may extract from the interaction information the position information and the orientation information of the camera and further determine the following information required for drawing the graphic object: screen coordinates, camera upward coordinates, world coordinates of camera, projection matrix of camera and clipping matrix from the camera to the world.

In some embodiments, the computing device usually is in a basically upward state when the user draws the AR with the device. In view of that, the upward vector (indicated as U) of the camera for example may be estimated as (0, 1, 0). Moreover, based on the forward vector (e.g., indicated as V) in the received interaction information, the second device may further calculate, based on the upward vector and the forward vector, an orthogonal rightward vector (e.g., indicated as R).

Furthermore, the second device may further determine, based on the above three direction vectors U, V and R, a rotation transformation matrix $R_{view}$:

$$R_{view} = \begin{vmatrix} Rx & Ry & Rz & 0 \\ Ux & Uy & Uz & 0 \\ Vx & Vy & Vz & 0 \\ 0 & 0 & 0 & 1 \end{vmatrix} \quad (1)$$

Besides, the second device may determine, based on the position information of the camera (e.g., represented as P), a translation transformation matrix $T_{view}$:

$$T_{view} = \begin{vmatrix} 1 & 0 & 0 & -Px \\ 0 & 1 & 0 & -Py \\ 0 & 0 & 1 & -Pz \\ 0 & 0 & 0 & 1 \end{vmatrix} \quad (2)$$

The second device may further determine a coordinate transformation matrix on the basis of the rotation transformation matrix $R_{view}$ and the translation transformation matrix $T_{view}$, i.e., $C=R_{view}*T_{view}$. Moreover, the second device may determine the clipping matrix from the camera to the world coordinate on the basis of the determined coordinate transformation matrix C and the camera parameter of the second camera on the second device. Besides, the second device may multiplex the projection matrix of the second camera and take the projection matrix of the second camera as the projection matrix of the first camera not transmitted by the first device.

In some embodiments, considering that the user usually is used to execute the user interactions by moving the computing device, the second device also may take the center coordinates of the screen of the second device approximately as the screen coordinates corresponding to the user interactions on the first device. Therefore, the transmission bandwidth of the interaction information may be further reduced.

In some embodiments, the first device also may include the screen coordinate information corresponding to the user interaction in the interaction information and send the screen coordinate information to the second device, causing the second device to generate graphic objects corresponding to the user interaction on the first device based on the screen coordinate information.

It is to be understood that the second device also may generate the interaction information sent to the first device based on the user interaction on the second device. The interaction module 420 on the first device also may generate the graphic objects displayed in the user interface of the first device through the above discussed methods on the basis of the camera parameter of the first camera of the first device and the interaction information received from the second device. The specific method for generating the graphic objects is similar to the method for generating the graphic object by the second device and will not be repeated here.

In view of the above discussed methods, the embodiments of the present disclosure can effectively reduce the network bandwidth required for transmitting the interaction information, so as to decrease the interaction delay and promote friendliness of the user interaction and experience in user interaction.

Continuing to refer to FIG. 4, the lightweight plug-in module 410 also may include the network module 425, which may be configured to execute operations related to the above discussed session communication process. In some embodiments, to facilitate management over the data packets of the communication data, the network module 425 also may be configured to acquire the communication data associated with the session and encapsulate the communication data into data packets, wherein the data packets include type information for indicating the type of the encapsulated communication data.

In some embodiments, the type information for example may include

Alternatively or additionally, . . . .

In some embodiments, the above different data types may be indicated by adding in the data packets the type identifiers corresponding to the data types. In this way, the embodiments of the present disclosure may allow a more effective management over various types of data packets, for example, to support a rapid filtering or screening of the data packets etc.

In some embodiments, the network module 425 also may be configured to encrypt the link address of the session. For example, the network module 425 may encrypt the link address with any suitable encryption algorithms. Such algorithms may include, but not limited to, MD5 algorithm etc.

In some embodiments, the lightweight plug-in module 410 also may include a universal module 430. In some embodiments, the universal module 430 may be configured to support decoupled communications between different engines.

As shown in FIG. 4, the lightweight plug-in module 410 may act as a plug-in program of the client application 640. As an example, the lightweight plug-in module 410 may implement the interactions with the client application 640 by a system support module 440. In some embodiments, the system support module 440 for example may include multiple different engines to fulfill various functions associated with the AR session. Running operations corresponding to these engines, for example, may be included in an installation program corresponding to the client application 460, such that these engines may operate as procedures independent of the client application 460.

For example, as shown in FIG. 4, the target application may include an engine 445 and an engine 450. According to FIG. 4, the engine 445 may communicate with the session 305 and the communication engine 450) may communicate with the client application 460 and the above discussed invitation server 310. In this way, the engine 445 and the engine 450 may fulfill different functions associated with the AR session. For example, the engine 445 may fulfill the session logic function, while the engine 450 for example may realize the user invitation related functions. Besides, the system support module 640 also may include an operating system AR module, e.g., to call the underlying AR power of the operating system.

In some embodiments, the universal module 430 may implement the decoupled communications between the engine 445 and the engine 450 through event mechanism. Specifically, the universal module 430 for example may include an event generator configured to generate an event message corresponding to the operation in response to the operation of the engine 445 or the engine 450. In some embodiments, the event message may include an event identification corresponding to this operation.

In some embodiments, the universal module 430 also may include an event monitor configured to monitor event messages generated the event generator, so as to trigger the engine 445 or the engine 450) to execute acts corresponding to the event messages.

As an example, when determining that the user 1 in the current AR session has updated his profile photo in the application, the engine 450) may trigger the universal module 30) 430 to distribute the events corresponding to the profile photo. Furthermore, the engine 445 may monitor via the universal module 430 that the event corresponding to the update of the profile photo has already occurred and extract from the event information the link address corresponding to the updated profile photo. Furthermore, the engine 445 may communicate with the session server 305, to update the image corresponding to the profile photo of the user in the current AR session.

It should be understood that the above specific event of update of the profile photo is just an exemplary event and other suitable types of events also may be defined according to the scene requirements. In this way, the decoupled communications may be implemented between different engines, so as to increase the expansibility of the lightweight plug-in module 410.

Example Procedure and Device

Figure 5:
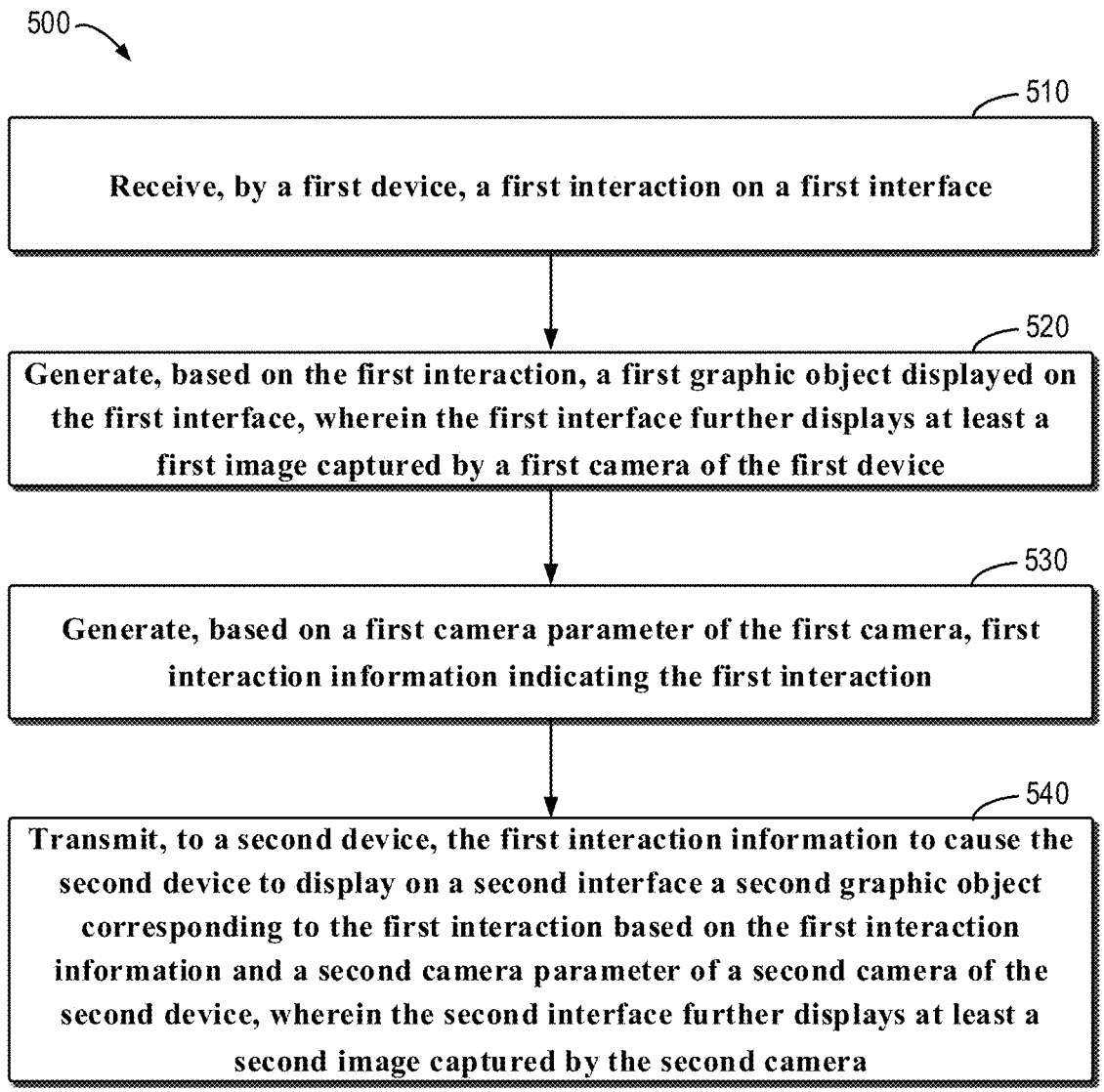
FIG. 5 illustrates a flowchart of the method for interactions according to some embodiments of the present disclosure.

FIG. 5 illustrates a flowchart of a method 500 for interactions in accordance with some embodiments of the present disclosure. The method 500, for example, may be implemented by the computing device 102 discussed with reference to FIGS. 1A to 1M and the computing device 202 discussed with reference to FIGS. 2A to 2K.

As shown in FIG. 5, at block 510, the first device receives a first interaction on a first interface.

At block 520, the first device generates, based on the first interaction, a first graphic object displayed on the first interface, wherein the first interface further displays at least a first image captured by a first camera of the first device.

At block 530, the first device generates, based on a first camera parameter of the first camera, first interaction information indicating the first interaction.

At block 540, the first device transmits to the second device the first interaction information to cause the second device to display on a second interface a second graphic object corresponding to the first interaction based on the first interaction information and a second camera parameter of a second camera of the second device, wherein the second interface further displays at least a second image captured by the second camera.

In some embodiments, the first interaction is received via a screen of the first device, and generating, based on the first interaction, the first graphic object displayed on the first interface comprises: obtaining screen coordinates corresponding to the first interaction determining, based on the screen coordinates and the first camera parameter, a display position of the first graphic object; and displaying, based on the display position, the first graphic object on the first interface.

In some embodiments, the method 500 further comprises: receiving from the second device second interaction information, the second interaction information being generated by the second device based on the second camera parameter and a second interaction on the second interface; and displaying on the first interface a third graphic object corresponding to the second interaction based on the second interaction information and the first camera parameter.

In some embodiments, the first interaction information includes: position information of the first camera; and orientation information of the first camera.

In some embodiments, the first interaction information excludes screen coordinate information corresponding to the first interaction.

In some embodiments, the method 500 further comprises: creating a session: transmitting to the second device a session invitation for joining the session; and in response to receiving a confirmation for the session invitation from the second device, generating the first interface corresponding to the session.

In some embodiments, wherein the session invitation includes an encrypted link generated by the first device.

In some embodiments, generating the first interaction information indicating the first interaction comprises: generating, by a lightweight plug-in module in the first device, the first interaction information based on the first camera parameter.

In some embodiments, the lightweight plug-in module further includes an event manager, wherein the event manager includes: an event generator configured to, in response to a first operation associated with the session executed by a first engine, generate an event message corresponding to the first operation, wherein the event message includes an event identification corresponding to the first operation; and an event monitor configured to monitor the event message generated by the event generator for triggering a second engine to execute a second operation corresponding to the first operation, wherein the first engine and the second engine are configured to respectively implement different functions associated with the session.

In some embodiments, the type information includes at least one of: first type information indicating that the communication data include network data for maintaining a session connection: second type information indicating that the communication data include identification information of users participating the session: third type information indicating that the communication data include control data of the session: fourth type information indicating that the communication data include snapshot data of the session: fifth type information indicating that the communication data include time data: or sixth type information indicating that the communication data include interaction data generated in the session.

Figure 6:
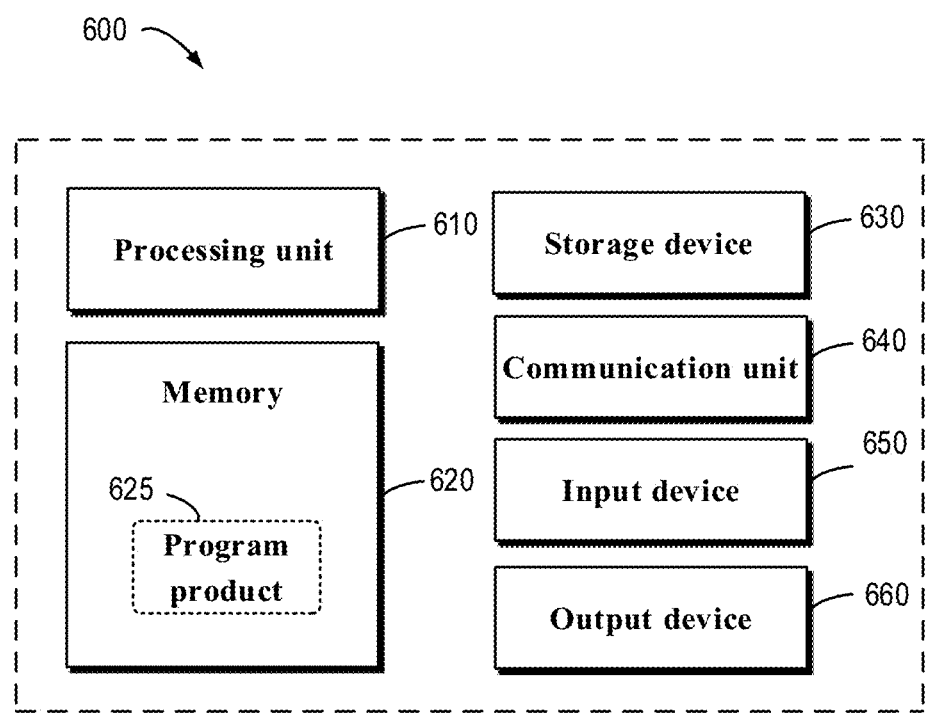
FIG. 6 illustrates a block diagram of a computing device that can implement a plurality of embodiments of the present disclosure.

FIG. 6 illustrates a block diagram of the computing device 600 (e.g., the computing device 102 discussed with reference to FIGS. 1A to 1M and/or the computing device 202 discussed with reference to FIGS. 2A to 2K) in which one or more embodiments of the present disclosure may be implemented. It is to be appreciated that the computing device 600 illustrated by FIG. 6 is just exemplary and shall not restrict the functions and the scope of the embodiments described herein.

The computing device 600 may include an interaction module configured to receive a first interaction on a first interface: generate, based on the first interaction, a first graphic object displayed on the first interface, wherein the first interface further displays at least a first image captured by a first camera of the electronic device: generate, based on a first camera parameter of the first camera, first interaction information indicating the first interaction. In addition, the computing device 600 also may include a network module configured to transmit, to a second device, the first interaction information, to cause the second device to display on a second interface a second graphic object corresponding to the first interaction based on the first interaction information and a second camera parameter of a second camera of the second device, wherein the second interface further displays at least a second image captured by the second camera.

In some embodiments, the first interaction is received via a screen of the electronic device, and the interaction module is further configured to: obtain screen coordinates corresponding to the first interaction: determine, based on the screen coordinates and the first camera parameter, a display position of the first graphic object; and display, based on the display position, the first graphic object on the first interface.

In some embodiments, the network module is further configured to receive, from the second device second interaction information, the second interaction information being generated by the second device based on the second camera parameter and a second interaction on the second interface; and the interaction module is further configured to display on the first interface a third graphic object corresponding to the second interaction based on the second interaction information and the first camera parameter.

In some embodiments, the first interaction information includes: position information of the first camera; and orientation information of the first camera.

In some embodiments, the first interaction information excludes screen coordinate information corresponding to the first interaction.

In some embodiments, the network module is further configured to create a session and transmit to the second device a session invitation for joining the session; and the interaction module is further configured to, in response to receiving a confirmation for the session invitation from the second device, generate the first interface corresponding to the session.

In some embodiments, the session invitation includes an encrypted link generated by the electronic device.

In some embodiments, the interaction module and the network module are implemented by a lightweight plug-in module.

In some embodiments, the lightweight plug-in module further includes an event manager, wherein the event manager includes: an event generator configured to, in response to a first operation associated with the session executed by a first engine, generate an event message corresponding to the first operation, wherein the event message includes an event identification corresponding to the first operation; and an event monitor configured to monitor the event message generated by the event generator for triggering a second engine to execute a second operation corresponding to the first operation, wherein the first engine and the second engine are configured to respectively implement different functions associated with the session In some embodiments, the network module is further configured to: obtain communication data associated with the session; and encapsulate the communication data into a data packet, wherein the data packet includes type information, the type information indicating a type of the encapsulated communication data.

In some embodiments, the type information includes at least one of: first type information indicating that the communication data include network data for maintaining a session connection: second type information indicating that the communication data include identification information of users participating the session: third type information indicating that the communication data include control data of the session: fourth type information indicating that the communication data include snapshot data of the session: fifth type information indicating that the communication data include time data: or sixth type information indicating that the communication data include interaction data generated in the session.

As shown in FIG. 6, the computing device 600 is in the form of a general computing device. Components of the computing device 600 may include, but not limited to, one or more processors or processing units 610, memory 620, storage device 630, one or more communication units 640, one or more input devices 650 or one or more output devices 660. The processing unit 610 may be a physical or virtual processor and can perform various processing in accordance with the programs stored in the memory 620. In a multi-processor system, a plurality of processing units perform the computer executable instructions in parallel to enhance the parallel processing capability of the computing device 600.

The computing device 600 usually includes a plurality of computer storage media, where the media may be any available medium accessible by the computing device 600 and include, but not limited to, volatile and non-volatile media, detachable and non-detachable media. The memory 602 may be a volatile memory (e.g., register, cache, and Random Access Memory (RAM)), non-volatile memory (such as Read-Only Memory (ROM), Electrically Erasable Programmable Read-Only Memory (EEPROM), flash) or any combinations thereof. The memory device 630 may be detachable or non-detachable medium and may include machine-readable medium, e.g., flash drive, magnetic disk or any other media as long as they can be provided for storing information and/or data (e.g., training data for training) and are accessible within the computing device/server 600.

The computing device 600 may further include a further detachable/non-detachable, volatile/non-volatile storage medium. Although not shown in FIG. 6, a magnetic disk drive for reading from or writing into the detachable and non-volatile magnetic disks (e.g., floppy disk) and an optic disk drive for reading from or writing into the detachable and non-volatile optic disks. In these situations, each drive may be connected to the bus (not shown) via one or more data medium interfaces. The memory 620 may include a computer program product 625 having one or more program modules, which program modules are configured to execute various methods or acts according to different embodiments of the present disclosure.

The communication unit 640 communicates with other computing devices through communication media. Additionally, the functions of the components in the computing device 600 may be implemented by a single computing cluster or a plurality of computing machines. These computing machines may communication through communication links. Therefore, the computing device 600 may operate within a networking environment using logic connections with one or more other servers, network personal computer (PC) or a further network node.

The input device 650 may be one or more input devices, e.g., mouse, keyboard and tracking ball etc. The output device 660 may be one or more output devices, such as display, speaker and printer etc. The computing device 600 also may communicate with one or more external devices (not shown) through the communication unit 640 in view of the requirements. The external devices, such as storage devices and display devices etc., may communicate with a device that enables interactions between the user and the computing device 600, or with any devices (e.g., network cards and modem etc.) that enable the computing device 600 to communicate with one or more other computing devices. These communications may be executed via Input/Output (I/O) interface (not shown).

Example implementations in accordance with the present disclosure provide a computer readable storage medium stored thereon with one or more computer instructions, wherein the one or more computer instructions are executed by the processor to implement the above described method.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions comprises an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various embodiments, are obvious for those skilled in the art. The selection of terms in the text aims to best explain principles and actual applications of each implementation and technical improvements made in the market by each embodiment, or enable those ordinary skilled in the art to understand implementations of the present disclosure.

I claim:

1. An interaction method comprising:
receiving, by a first device, a first interaction on a first interface;
generating, based on the first interaction, a first graphic object displayed on the first interface, wherein the first interface further displays at least a first image captured by a first camera of the first device;
generating, based on a first camera parameter of the first camera, first interaction information indicating the first interaction; and
transmitting, to a second device, the first interaction information to cause the second device to display on a second interface a second graphic object corresponding to the first interaction based on the first interaction information and a second camera parameter of a second camera of the second device, wherein the second interface further displays at least a second image captured by the second camera.

2. The method of claim 1, wherein the first interaction is received via a screen of the first device, and generating, based on the first interaction, the first graphic object displayed on the first interface comprises:
obtaining screen coordinates corresponding to the first interaction;
determining, based on the screen coordinates and the first camera parameter, a display position of the first graphic object; and
displaying, based on the display position, the first graphic object on the first interface.

3. The method of claim 1, further comprising:
receiving from the second device second interaction information, the second interaction information being generated by the second device based on the second camera parameter and a second interaction on the second interface; and
displaying on the first interface a third graphic object corresponding to the second interaction based on the second interaction information and the first camera parameter.

4. The method of claim 1, wherein the first interaction information includes:
position information of the first camera; and
orientation information of the first camera.

5. The method of claim 4, wherein the first interaction information excludes screen coordinate information corresponding to the first interaction.

6. The method of claim 1, further comprising:
creating a session;
transmitting to the second device a session invitation for joining the session; and
in response to receiving a confirmation for the session invitation from the second device, generating the first interface corresponding to the session.

7. The method of claim 6, wherein the session invitation includes an encrypted link generated by the first device.

8. The method of claim 6, wherein generating the first interaction information indicating the first interaction comprises: generating, by a lightweight plug-in module in the first device, the first interaction information based on the first camera parameter.

9. The method of claim 8, wherein the lightweight plug-in module further includes an event manager, wherein the event manager includes:
an event generator configured to, in response to a first operation associated with the session executed by a first engine, generate an event message corresponding to the first operation, wherein the event message includes an event identification corresponding to the first operation; and
an event monitor configured to monitor the event message generated by the event generator for triggering a second engine to execute a second operation corresponding to the first operation,
wherein the first engine and the second engine are configured to respectively implement different functions associated with the session.

10. The method of claim 8, wherein the lightweight plug-in module further includes a network module configured to:
obtain communication data associated with the session; and
encapsulate the communication data into a data packet, wherein the data packet includes type information, the type information indicating a type of the encapsulated communication data.

11. The method of claim 10, wherein the type information includes at least one of:
first type information indicating that the communication data include network data for maintaining a session connection;
second type information indicating that the communication data include identification information of users participating the session;
third type information indicating that the communication data include control data of the session;
fourth type information indicating that the communication data include snapshot data of the session;
fifth type information indicating that the communication data include time data; or
sixth type information indicating that the communication data include interaction data generated in the session.

12. A first device, comprising:
a memory; and
a processor;
wherein the memory stores one or more computer instructions which, when executed by the processor, cause the first device to perform acts comprising:
receiving a first interaction on a first interface of the first device;
generating, based on the first interaction, a first graphic object displayed on the first interface, wherein the first interface further displays at least a first image captured by a first camera of the first device;
generating, based on a first camera parameter of the first camera, first interaction information indicating the first interaction; and
transmitting, to a second device, the first interaction information to cause the second device to display on a second interface a second graphic object corresponding to the first interaction based on the first interaction information and a second camera parameter of a second camera of the second device, wherein the second interface further displays at least a second image captured by the second camera.

13. A non-transitory computer readable storage medium having one or more computer instructions stored thereon, wherein the one or more computer instructions, when executed by a processor, implement acts comprising:
receiving, by a first device, a first interaction on a first interface;
generating, based on the first interaction, a first graphic object displayed on the first interface, wherein the first interface further displays at least a first image captured by a first camera of the first device;
generating, based on a first camera parameter of the first camera, first interaction information indicating the first interaction; and
transmitting, to a second device, the first interaction information to cause the second device to display on a second interface a second graphic object corresponding to the first interaction based on the first interaction information and a second camera parameter of a second camera of the second device, wherein the second interface further displays at least a second image captured by the second camera.

14. The non-transitory computer readable storage medium of claim 13, wherein the first interaction is received via a screen of the first device, and generating, based on the first interaction, the first graphic object displayed on the first interface comprises:
obtaining screen coordinates corresponding to the first interaction;
determining, based on the screen coordinates and the first camera parameter, a display position of the first graphic object; and
displaying, based on the display position, the first graphic object on the first interface.

15. The non-transitory computer readable storage medium of claim 13, the acts further comprising:
receiving from the second device second interaction information, the second interaction information being generated by the second device based on the second camera parameter and a second interaction on the second interface; and
displaying on the first interface a third graphic object corresponding to the second interaction based on the second interaction information and the first camera parameter.

16. The non-transitory computer readable storage medium of claim 13, wherein the first interaction information includes:
position information of the first camera; and
orientation information of the first camera.

17. The non-transitory computer readable storage medium of claim 16, wherein the first interaction information excludes screen coordinate information corresponding to the first interaction.

18. The non-transitory computer readable storage medium of claim 13, the acts further comprising:
   creating a session;
   transmitting to the second device a session invitation for joining the session; and
   in response to receiving a confirmation for the session invitation from the second device, generating the first interface corresponding to the session.

19. The non-transitory computer readable storage medium of claim 18, wherein the session invitation includes an encrypted link generated by the first device.

20. The non-transitory computer readable storage medium of claim 18, wherein generating the first interaction information indicating the first interaction comprises: generating, by a lightweight plug-in module in the first device, the first interaction information based on the first camera parameter.

\* \* \* \* \*